United States Patent [19]
Kwong

[11] 3,905,629
[45] Sept. 16, 1975

[54] IMPACT REDUCER FOR VEHICLES

[75] Inventor: Luen Kwong, Oakland, Calif.

[73] Assignee: The Raymond Lee Organization, Inc., New York, N.Y. ; a part interest

[22] Filed: May 2, 1974

[21] Appl. No.: 466,250

[52] U.S. Cl. .................. 293/24; 293/66; 293/73; 267/139
[51] Int. Cl.² .......................... B60R 19/00
[58] Field of Search .................. 267/139; 293/24–26, 34, 35, 60, 65, 66, 69, 73, 84, 85, 89

[56] References Cited
UNITED STATES PATENTS

| 663,313 | 12/1900 | Watson | 293/34 |
| 1,772,906 | 8/1930 | Lukan | 293/34 |
| 2,128,656 | 8/1938 | Long | 293/66 |
| 2,954,255 | 9/1960 | Bates | 293/66 |
| 3,084,517 | 4/1963 | Bell | 293/66 X |
| 3,709,542 | 1/1973 | Fehlau et al. | 293/73 |

FOREIGN PATENTS OR APPLICATIONS

| 1,129,712 | 1/1957 | France | 293/73 |

*Primary Examiner*—John J. Love
*Attorney, Agent, or Firm*—Howard I. Podell

[57] ABSTRACT

An energy absorbing device adaptable for installation on the bumper of a vehicle which reduces the effect of collision of the equipped vehicle with another vehicle or objects. The unit is formed of a telescopic section which is rotatably mounted to the front or rear frame or bumper of the vehicle by means of a mounting bracket.

3 Claims, 5 Drawing Figures

PATENTED SEP 16 1975  3,905,629

IMPACT REDUCER FOR VEHICLES

SUMMARY OF THE INVENTION

This invention relates to a device for reducing the impact force exerted on a motor vehicle body during a collision, and particularly to a telescopic unit which may be rotatably mounted to a front or rear bumper of a vehicle. The prime advantage of this device is that it will reduce costly damage to a vehicle on which it is installed in the event of a collision with another vehicle or solid object. A further advantage of the device is that it may be readily added to an existing vehicle.

BRIEF DESCRIPTION OF THE DRAWING

The objects and features of the invention may be understood with reference to the following detailed description of an illustrative embodiment of the invention, taken together with the accompanying drawings in which.

Figure 1:
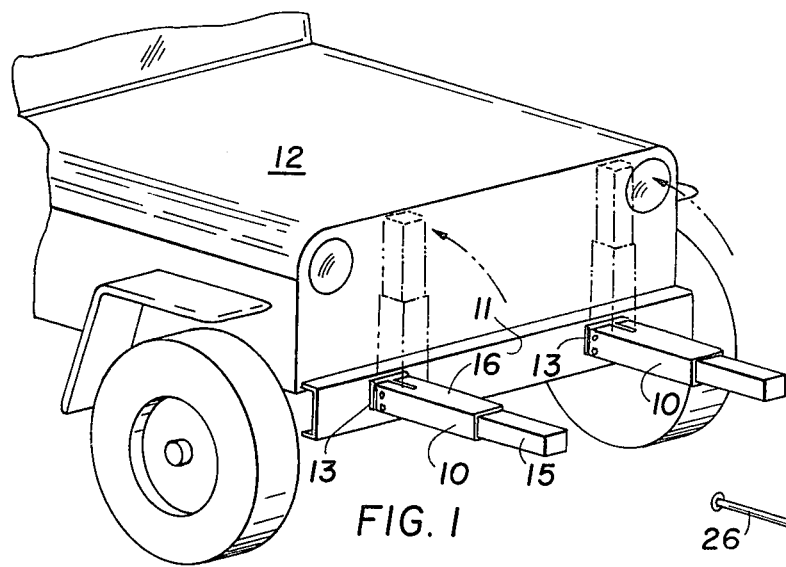
FIG. 1 is a perspective view of a pair of the devices mounted to an automobile.

DESCRIPTION OF THE PREFERRED EMBODIMENT:

Turning now descriptively to the drawings, in which similar reference characters denote similar elements throughout the several views, FIG. 1 illustrates a pair of the shock absorbing devices 10 mounted to the front bumper 11 of a vehicle 12 by means of brackets 13 which permit each device 10 to fold to a vertical stored position shown by dotted lines, when not in use. The devices 10 may be mounted, as shown in FIG. 1 in the horizontal position or alternately the devices 10 may be mounted in the vertical position, with a sudden deceleration of the vehicle resulting in the devices automatically rotating into the horizontal position, immediately prior to a collision.

Figure 2:
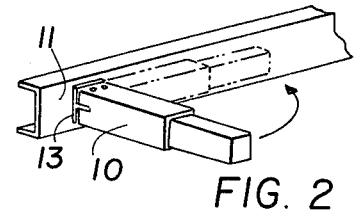
FIG. 2 is a perspective view of the device mounted in an alternate fashion to the bumper of a vehicle.

As shown in FIG. 2, bracket 13 may be mounted on bumper 11 so as to permit folding of the device 10 in the horizontal plane, for storage purposes.

The device 10 is formed of an extendible telescopic member 15 which is extended out of a housing member 16 by compression means, with the housing member 16 pivotably mounted to the bracket 13 fastened to a bumper 11.

Figure 3:
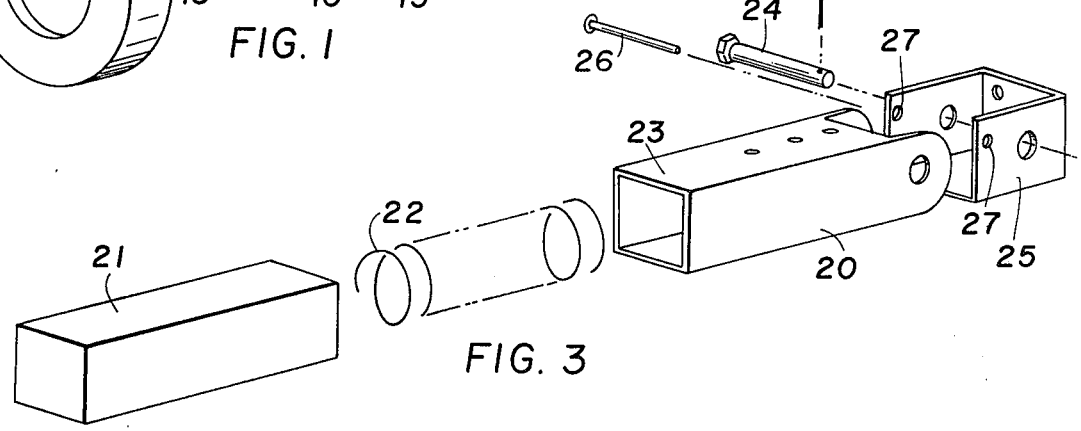
FIG. 3 is an exploded perspective view of the device and mounting bracket.

As shown in FIG. 3, an alternate form of the device 20 may consist of an extendible telescopic member and a compression spring 22 mounted in the housing member 23, with the housing member 23 mounted by a pivotable pin 24 to the bumper mounting bracket 25. A shear pin 26 may be inserted in matching holes 27 in the bracket 25 to restrain the housing member in the folded stored position, with the shear pin 26 either fractured by deceleration prior to the collision to permit the telescopic member 20 to rotate into the horizontal extended position, or the shear pin 26 may be manually removed, when it is desired to set the device 20 in the operating position.

Figure 4:
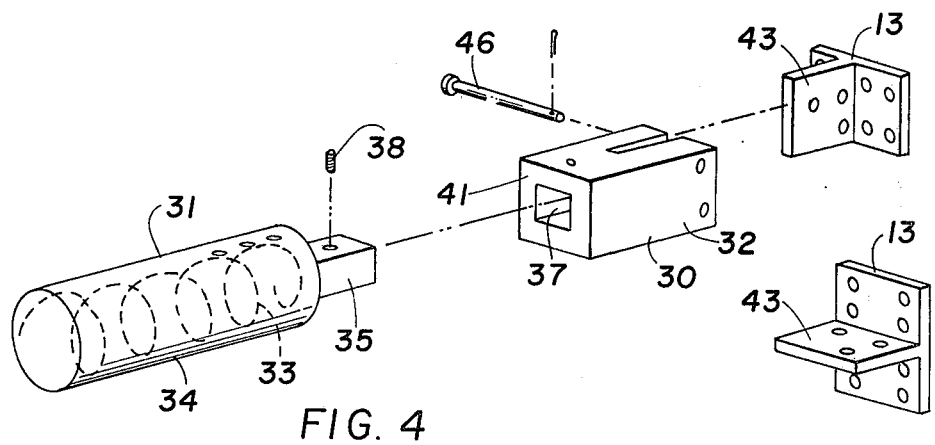
FIG. 4 is an exploded perspective view of an alternate form of the device and mounting bracket.
Figure 5:
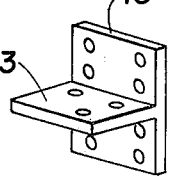
FIG. 5 is a perspective view of the mounting bracket positioned for rotation of the device in the horizontal plane.

An alternate form of the device 30 is shown in FIG. 4 in which the telescopic member 31 is mounted externally of the housing member 32 and formed of a compression spring 33 mounted inside of a compressible core 34, and joined to a projection 35 which fits inside of an opening 37 of the housing member 32 to which it is fastened by pin 38. The telescopic member 31 collapses against the front face 41 of the housing member 32 under the force of a collision impact. Housing member 32 is slotted to fit about T-shaped bracket 13 which may be mounted as shown in FIG. 4 so that the T section 43 lies in the vertical plane, or as shown in FIG. 5 in the horizontal plane. The device 30 pivots about pin 46 when assembled to the T-section of bracket 13. Telescopic member 31 may be fabricated of an elastic material to obviate the need of a compression spring 33.

The device, when extended ahead of the vehicle absorbs energy of collision by the movement of the telescopic member into the housing or by compression of the telescopic member.

An auxilliary bumper, not shown, may be employed to join the outer faces of each of a pair of devices.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A collapsible member that may be mounted on a bumper of a vehicle to absorb the energy of a collision, said member fastened to a bracket which is attachable to the bumper so that the collapsible member may be alternately stored in a retracted position adjacent to the bumper to which the bracket is attached, or extended automatically prior to collision to project ahead of the attached bumper, in which the collapsible member includes a housing fastened to the bracket and an extendable section, with said extendable section protruding through the end of the housing, together with a compression spring in the housing which bears against the extendable section, together with frangible means that retains the collapsible member in the retracted position, said frangible means shaped to fracture under the inertia force caused by a high deceleration applied to the collapsible member by virtue of a rapid braking action of the attached vehicle, said inertia force causing the collapsible member to move to the extended position so that the extendable member will absorb the energy of a collision which occurs after the onset of such deceleration.

2. The combination recited in claim 1 in which the collapsible member is rotatably fastened by pivot means to the bracket.

3. The combination recited in claim 2 in which the collapsible member is retained in the retracted position, in which the collapsible member is rotated to a position adjacent to the bumper to which the bracket is attached, by a shear pin fastened to the collapsible member and the bracket, said shear pin serving as the frangible means to retain the collapsible member in the retracted position, with the inertia forces of high deceleration of the vehicle serving to rotate the collapsible member away from the attached bumper, fracturing the shear pin and projecting the end of the extendable member ahead of the attached bumper.

* * * * *